(No Model.) 5 Sheets—Sheet 1.

J. P. ALEXANDER.
AUTOMATIC SWITCH.

No. 576,082. Patented Feb. 2, 1897.

Witnesses
Edw. D. Duvall Jr.
H. S. Duvall

Inventor
John P. Alexander
by
Frankland Jannus
his Attorney (No Model.)  
5 Sheets—Sheet 2.

J. P. ALEXANDER.
AUTOMATIC SWITCH.

No. 576,082. Patented Feb. 2, 1897.

Witnesses  
Inventor  
John P. Alexander (No Model.) 5 Sheets—Sheet 3.
J. P. ALEXANDER.
AUTOMATIC SWITCH.

No. 576,082. Patented Feb. 2, 1897.

Witnesses
Inventor
John P. Alexander (No Model.)

J. P. ALEXANDER.
AUTOMATIC SWITCH.

No. 576,082. Patented Feb. 2, 1897.

Witnesses
Edw. S. Duvall Jr.
W. S. Duvall

Inventor
John P. Alexander
by
Frankland Jannus
his Attorney (No Model.)  5 Sheets—Sheet 5.

J. P. ALEXANDER.
AUTOMATIC SWITCH.

No. 576,082. Patented Feb. 2, 1897.

Witnesses
Edw. D. Duvall Jr.
W. S. Duvall

Inventor
John P. Alexander
by Frankland Jannus
his Attorney

UNITED STATES PATENT OFFICE.

JOHN P. ALEXANDER, OF JACKSON, TENNESSEE, ASSIGNOR TO HENRY W. McCORRY, OF SAME PLACE.

AUTOMATIC SWITCH.

SPECIFICATION forming part of Letters Patent No. 576,082, dated February 2, 1897.

Application filed May 29, 1896. Serial No. 593,644. (No model.)

*To all whom it may concern:*

Be it known that I, JOHN P. ALEXANDER, a citizen of the United States, residing at Jackson, in the county of Madison and State of Tennessee, have invented certain new and useful Improvements in Automatic Switches, of which the following is a description, reference being had to the accompanying drawings and to the letters and figures of reference marked thereon.

My invention relates to improvements in methods of and apparatus for distributing current to sectional, separate, or disconnected circuits; and it comprises, broadly, an automatic switch for controlling the supply of current to the separate circuits or sections of a circuit.

The switch as usually constructed is arranged within a box through which a circuit passes, which circuit includes one or more of the boxes used in the system to which the invention is applied. The current may enter the box through a circuit especially designed for the operation of the box or boxes, or it may be the main supply-circuit itself. With whichever arrangement is adopted the circuit on entering the box divides and traverses the same in two equal branches which unite at or near the point where they issue from the box, passing thence back to the source of current or to the succeeding box or boxes in the series. In a bridge between the balanced conductors of the switch-box are arranged circuit-controlling devices in the nature of automatic switches, which are thrown into operation by the unbalancing of the main switch-box circuit, which may be accomplished by automatic mechanical means or by the simple pushing of a button connected with a circuit-breaker to momentarily interrupt one side of the balanced circuit of the box, the effect of which will be to shunt current through the bridge-wire in the circuit of which the switch devices are included. This action closes connections between the main supply-conductor and the circuit or circuits to be supplied with current, and these branch circuits are kept closed by the automatic electric switching apparatus contained in the box so long as sufficient current flows through the branch circuits to keep the electromagnets which control them energized. When the flow of current in the circuits controlled by the box ceases, the switching devices automatically open the circuit and the current passes through the box by way of the balanced circuit without affecting the said switching devices until the balance of the circuit shall be again interrupted.

It will be obvious that this invention has a wide range of applicability, and it is herein claimed in the broadest sense. It is, however, hereinafter set forth in connection with an electric-railway system, the same furnishing one of its most desirable uses. In carrying out this embodiment of my invention I provide main current-supplying conductors, which may be placed in any convenient position above or below the surface. These conductors convey the current from the source, and my invention relates especially to the means provided for establishing connection between the main supply-conductors and the sectional working conductors, which are those from which the traveling contact devices of the electric-railway motor-cars collect the current to operate the motors upon said cars.

A series of automatic switch-boxes are placed at intervals along the line of the railway and serve to connect the main supply-conductor with the several sections of the sectional working conductor or with groups of discontinuous working contacts arranged at the surface and along the line of way by connections which for convenience will be hereinafter referred to as "feeder" connections. In some instances, as where the line is comparatively short or the travel light, the main supply-conductor passes through the switch-boxes in series and is connected in multiple arc to the feeder connections by the means provided in each box. In other instances the main supply-conductor is carried in the vicinity of the boxes and connected to certain points therein, so that it may be connected with the feeder connections by the mechanism of the box, said mechanism itself being automatically operated by a separate circuit, including the boxes in series, and separately supplied with current for that purpose. With either arrangement the conductor which traverses the switch-boxes is divided at the point of entry and where it leaves each box and traverses the same by two conductors, the resistance of which is substantially equal. The automatic switching devices are connected in a bridge across the divided circuit of the box, so that when one branch of said circuit is momentarily open the flow of current will be diverted and part of it will pass by the bridge through the automatic switch devices, which will thereupon become active and close the circuit or circuits connecting the main supply-current with the feeder connections extending to the working conductor or contacts. I also provide means whereby the flow of current is maintained upon the section occupied by a car, so as to maintain the connections during the time the current is being taken from the live section of working conductor.

The balanced circuit normally traversing the switch-boxes in series without affecting the switching devices therein is interrupted by mechanical means upon the entrance of a car to the section controlled by the box, and this may be arranged so that in a single-track line the box will be operated and current supplied to the section in advance in whichever direction the car may be moved; or, as in a double-track line, the arrangement may be such that the box will make connection only with the section of conductor on one side thereof, so that the car will only energize the section in advance of it when traveling in one direction. When, however, the car has left said section and current is no longer taken, the feeder-circuit of the box will be automatically open and the current will flow through the divided circuit until the same is again disturbed and the switching devices called into operation.

My invention also includes means for carrying the same into effect, such as hereinafter set forth, and shown in the accompanying drawings, together with other details which will be referred to in the claims.

In said drawings, Fig. 2$^a$ is an enlarged diagrammatic view of a portion of Fig. 2. Fig. 8 is a side elevation, partly in section, showing a form of the traveling contact device for a surface-contact system.

Figures 1, 2, 7:
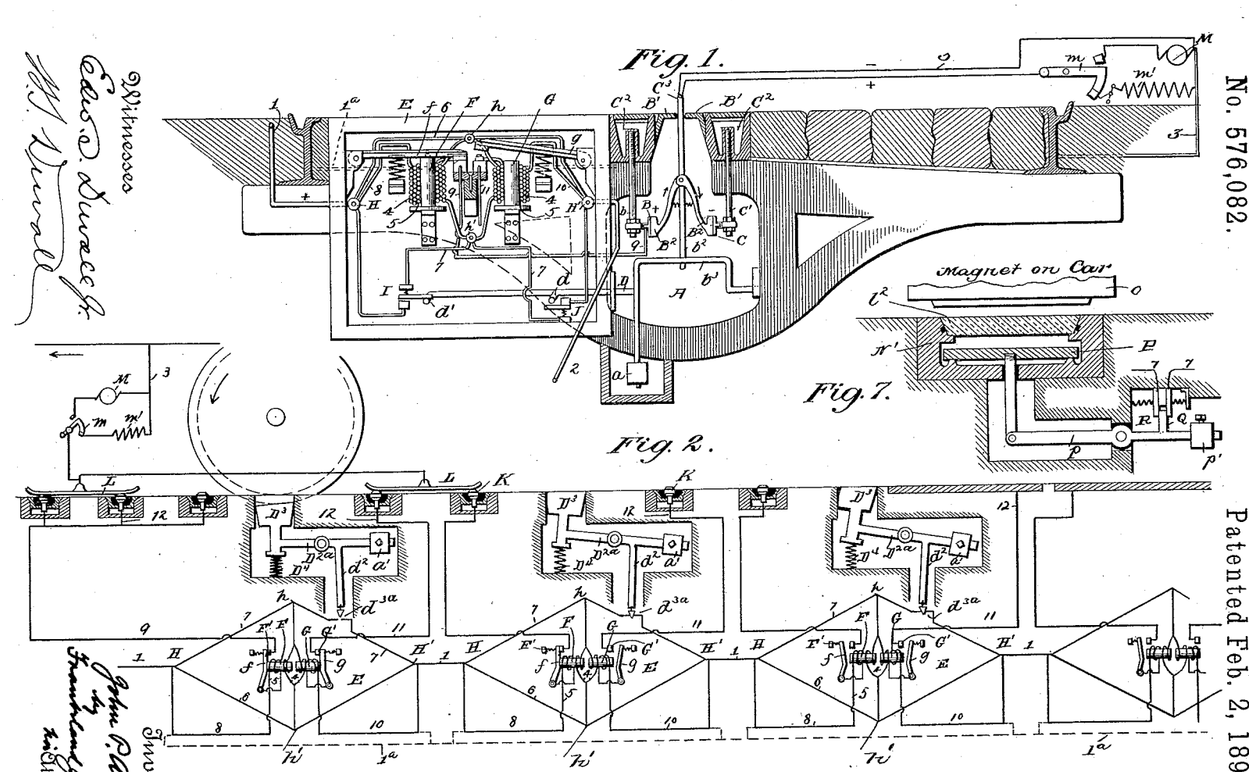
Figure 1 is a transverse sectional elevation of an underground-conduit electric railway, showing the switch-box also in elevation and on an enlarged scale, with portions of the circuits in diagram.
Fig. 2 is a diagrammatic view showing portions of an electric railway, with the switch-boxes in diagram and the manual operating devices in elevation.
Fig. 7 shows a form of magnetic circuit-breaking device in enlarged sectional elevation.

In the drawings, A, Fig. 1, is an underground conduit for an electric-railway system. B and C are the positive and negative conductors thereof, which, as shown, are supported by rods $b$ and $C'$, extending upward and sustained in suitable insulators $C^2$.

B' B' are the slot-rails, between which extends the plow $C^3$. To the plow are hinged contact-carrying arms $B^2 B^2$, which are provided with outwardly-pressing springs. An extension $b^2$ extends downward and is adapted to engage a projection or crank $b^3$ of the rocker-arm D, which is rotatably mounted across the conduit A and may be provided with a counterweight $a$ or other device for assisting its return to its normal position.

As indicated at the left side of Fig. 1, E is the contact-box. 1 and 2 indicate, respectively, the ingoing and outgoing portions of the main supply-conductor connected with the box E for supplying the current to the positive working conductor B in the conduit. The return-conductor is indicated at 3, and is connected to the conductor C or to the rails, or to both.

Figure 6:
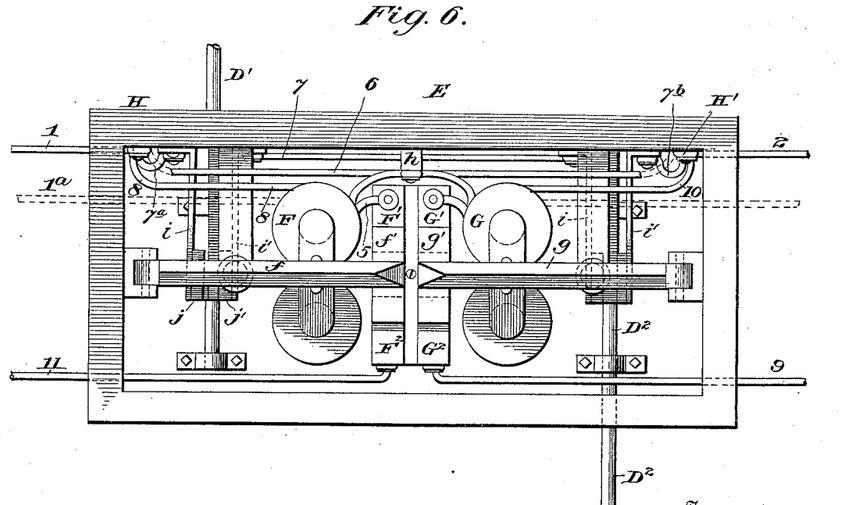
Fig. 6 is a plan view of the switch-box.

F G are two electromagnets, each provided with a pivoted armature $f g$, which are normally spring-held away from the poles thereof. $F' F^2 G' G^2$ are separated contact-blocks adapted to be bridged by contact-pieces $f' g'$, carried by the armatures $f g$, as indicated in Fig. 6, when the same are drawn downward by their cores F G.

The magnets F G are each provided with two separate windings marked 4 5 on each, the winding 4 being connected in the bridge between $h$ and $h'$, while the winding 5 forms part of the branch or feeder connections and is secondary in its action and serves to maintain the magnetism of one or other of the magnets F G to hold the desired contacts and maintain the circuit through the box while current is being supplied to the section controlled by the active magnet.

The main supply-conductor 1 on entering the box E divides at H and passes thence by conductors 6 and 7, which traverse the box and unite at the point H', passing thence by conductor 2 to the next box. The total normal resistance of the conductors 6 and 7 is equal, and therefore when the box is not in use the current will divide and pass equally through said conductors. Two circuit-breakers I J are provided in the conductor 7, and, as indicated, these circuit-breakers are respectively near opposite ends of the box. The outside windings 4 4 of the magnets F G are connected in multiple arc between the conductors 6 and 7, said connections extending from the point $h$ on conductor 6 to the point $h'$ on conductor 7.

The rock-shaft D is provided with tappets $d d'$, one of which operates the circuit-breaker J when the shaft is rotated in one direction, the other one, $d'$, acting upon the circuit-breaker I when the said shaft is rocked in the opposite direction, so that if the plow $C^3$ attached to the motor-car be traveling in one direction its extension $b^2$ will strike the crank $b^3$ from one side and rotate the rock-shaft in one direction, whereas if it is traveling in the opposite direction the reverse action will take place. The opening of the circuit of the conductor 7 by this means is but momentary, the parts being restored to their normal positions by the action of the counterweight $a$ or any equivalent device. When one of the circuit-breakers is operated to open the circuit, as, for example, at I, Fig. 1, the balance previously existing between the conductors 6 and 7 will be momentarily destroyed and current will flow from the point H through the winding 4 of the magnet F to the point $h'$ on the conductor 7, and thence out by way of conductor 7, circuit-breaker $d$, and point H'. This will energize said magnet and draw down the armature $f$ on the contact-blocks F' F². The second winding 5 upon the magnet F is connected by conductor 8 with the point H to the main supply-circuit, its other extremity being connected to the contact-block F'. Conductor 9 is connected to the opposite block F² and extends thence to the working conductor B. From this it will appear that the momentary opening of the circuit-breaker caused by the striking of the rock-shaft mechanism by the extension carried by the car will disturb the balance of the box and divert current across the bridge between the divided conductor traversing the box. This momentarily-diverted current passes through a winding which energizes the magnet, drawing down its armature and closing the feeder-circuit extending from the main supply-conductor to the working conductor of the railway. It will be apparent that this supply of current will continue so long as the magnet F is energized, and this will be the case so long as current is consumed by the car. The adjoining section of working conductor is similarly supplied through the magnet G and contacts G' G² and conductor 10, only a portion of which is shown in Figs. 1 and 5, and in said figures the armature $g$ is seen in inoperative position on the assumption that no current is being used in the section of working conductor supplied by conductor 10 and that the momentary energy imparted to said magnet G by the opening of the circuit-breaker I has passed and that the spring has raised the armature away from the contacts G' G².

The car-motor is indicated at M, while $m$ is a switch-lever which is connected with the plow and receives the main current, directing it either through the motor M or through a suitable resistance $m'$ also carried by the car, so that sufficient current will be passed through the energized section of working conductor to keep the magnet in the switch-box alive and maintain the contacts through which the section is supplied with current until the car has left that section.

The armatures $f g$ should be faced with some material of low induction coefficient or an air-gap should be provided for in order to prevent sticking. The circuits of the box are arranged so that as much current as is needed to draw down the armatures is shunted through the magnet or magnets, which are of single or double construction, in order to make the necessary decrease in resistance to secure the desired proportion of current.

Figure 5:
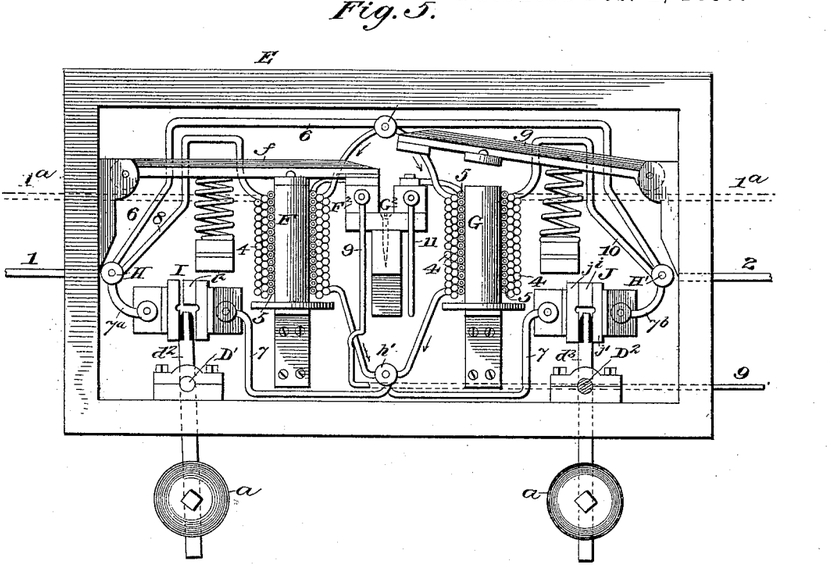
Fig. 5 is a side elevation of the switch-box, partly in section.

As indicated in Figs. 5 and 6, two separate rock-shafts D' D² are provided, extending on opposite sides of the box, so that in the case of a double-track railway one of said rock-shafts may be operated by the car on one track and the other by the car on the other track. When so used, however, the switch devices of the box will be operated only by a car passing always in the same direction, and it will therefore constitute a block to a car running backward, or from the wrong direction, and this I consider an important feature, although of course a double-acting box may be provided for each track where preferred.

The circuit-breakers I J, Figs. 5 and 6, each comprise springs $i\ i'$, secured at one end of the frame of the box E and extending outward parallel to each other and provided at their free ends with contact-pieces $j\ j'$, of carbon or other conducting material. A stationary block $i^2$ is attached to the frame of the box and is held in position for the blocks $j j'$ to normally press against and complete the circuit. The rock-shafts D D' are provided with upwardly-extending insulated arms $d^2\ d^3$, which fit in between the lower portions of the contacts $j\ j'$. When either of the rock-shafts is moved, its arm will press in one direction or the other against one of the blocks $j$ or $j'$ and force it away from and out of contact with its stationary block, thereby opening the circuit. The counterweight will restore the rock-shaft to its normal position, and the resiliency of the springs $i\ i'$ will insure their contacts being brought up against the stationary blocks when the rock-shafts assume their normal position.

The springs $i\ i'$ are connected to the points H H' by conductors $7^a\ 7^b$.

Figure 2A:
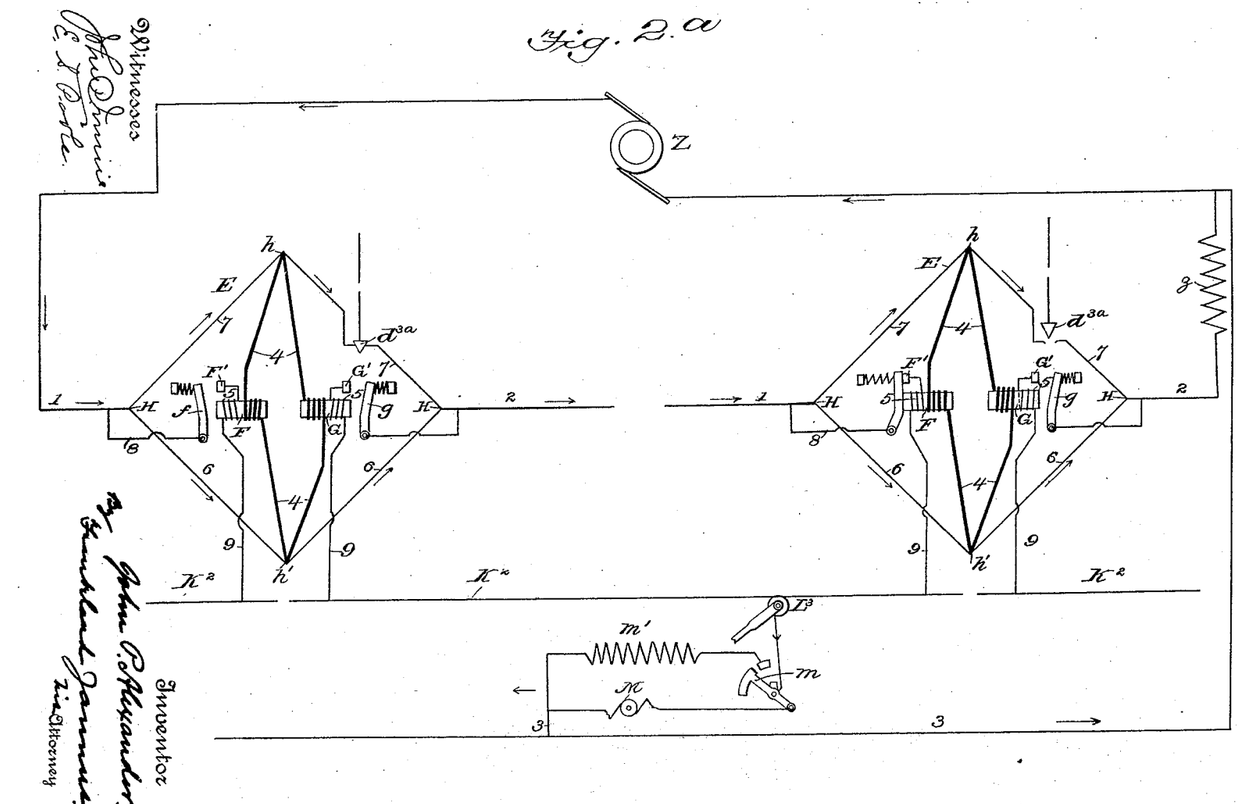

Fig. 2ᵃ shows in diagram substantially that which has just been described. In said figure the bridge-conductors, that is to say, the circuit between the points $h\ h'$, are indicated as of lower resistance and greater current-carrying capacity than the conductors 6 7, between which they are connected. It therefore follows that when the divided and balanced circuit represented by the conductors 6 7 is interrupted or its balance disturbed the current will flow through the bridge spanning said conductors, and although the circuits of conductors 6 7 may be completed momentarily thereafter the flow of current having once been established through the bridge-circuit, which affords a path of lower resistance, it will continue for an appreciable time, during which the switch mechanism becomes energized and establishes a feeder-circuit connected with the section onto which the contact is passing. The flow of current therethrough and through the coils of the switch-magnets will maintain the connections in said bridge-circuit until the consumption of current in the section supplied thereby ceases, when the switch-magnets will be cut out by the action of mechanical devices provided for that purpose. Z indicates a source of current which is connected to the conductor 1, entering the box, and the conductor 2, issuing therefrom, is in turn connected to the conductor 1 of the next box, and so on throughout the series.

The circuits in Fig. 2$^a$ are as follows: from the source of current 1 into box E, thence normally through conductors 6 7 and out by conductor 2, which is connected to conductor 1 of the next box. The balanced conductors 6 7 are spanned by the bridge-wires 4 4, which extend between the points $h\ h'$ and include the cores of the electromagnets F G. The cores F G also carry windings 5 5, which are connected with the contacts F' G' and with the sections to be supplied respectively thereby, one on each side of the box.

As shown in the drawings, the contact device L$^3$ is receiving current from the section supplied through the coils 5 of the box which said contact has just passed, as indicated by the arrow, and will continue to be so supplied until the switch mechanism of the box in advance of it has been energized, and so on. In case no cars are in operation it might be well to provide a resistance $z$ somewhere in the return-circuit for purposes of current regulation.

When the balanced circuit is interrupted by the passage of the contact device, both magnets F and G will be temporarily energized, but the current will continue to flow only through the winding 5 of the magnet controlling the section from which current is being taken, the other magnet being immediately demagnetized by the cessation of currents in the bridge-conductors 4 4, due to the reëstablishment of the balanced circuits, which then carry whatever current is not at the time passing into the feeder-circuit through conductor 8, armature $f\ f$, contact F', winding 5, and conductor 9.

K$^2$ represent the sections of the working conductor connected with the switches and which are successively engaged by the contact L$^3$, which is connected with the switch $m$ and the motor-circuit, as described.

Figure 3:
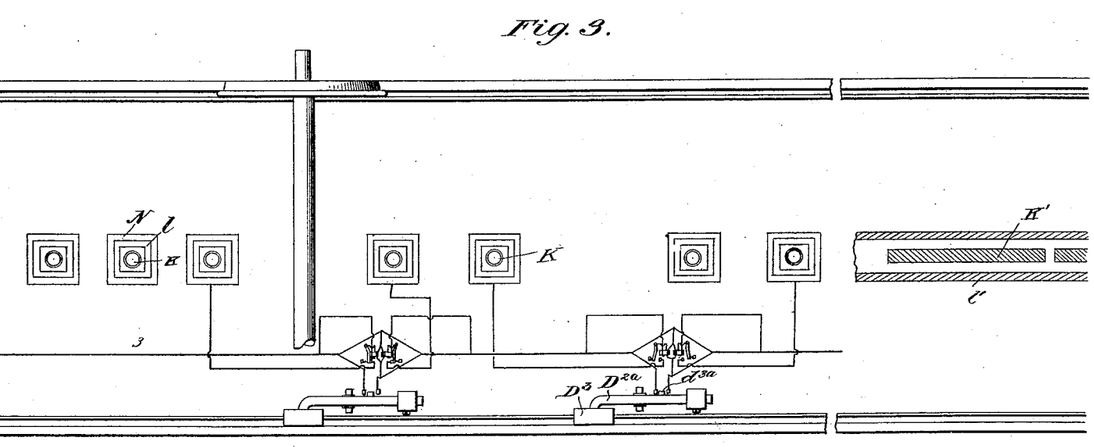
Fig. 3 is a plan view partly of what is shown in Fig. 2, also partly in diagram.

As indicated in Figs. 2 and 3, the working current is collected by a different method. As there shown, isolated contacts K are located just above the surface of the center of the track, and the circuit-breaking apparatus is arranged below one of the rails, so as to be operated by one of the wheels of the vehicle. The circuit-breaking apparatus may comprise a pivoted lever D$^{2a}$, situated in a suitable sunken box or casing and provided with an upwardly-extended head D$^3$, projecting normally into the path of the flanges of the wheels of the car. This lever may be provided with a retracting-spring D$^4$ and also with a counterweight $a'$, if desired. An extension $d^2$ actuates the circuit-breaker $d^{3a}$, which opens and closes the conductor 7. With this arrangement a number of separate contacts K are connected with the supply-conductors 9 and 11 of the box E, and the current may be collected by sliding shoes L L, which are electrically connected. Any desired number of the contacts K may be connected with a supply from a single box, this being determined by the conditions of practice. As indicated in said Figs. 2 and 3, the main supply-current is carried by the conductor 1$^a$, (shown in broken lines,) said conductor being connected with the circuits 8 9 and 10 11. As indicated in these figures, the main supply-current does not normally pass through the switch-box, but is carried by a separate conductor 1$^a$ and switched into contact with the feeder connections and the sections of working conductor as the boxes are brought into operative condition by the disturbance of their balance, due to the mechanism operated by the passage of the car and the consequent energizing of the automatic switches. With this arrangement the boxes E are separately supplied through conductors 1 2, which are the same as described with reference to Figs. 1, 5, and 6, except that a much smaller current is normally passed through said conductors where the additional main supply-conductor 1$^a$ is used.

Figure 8:
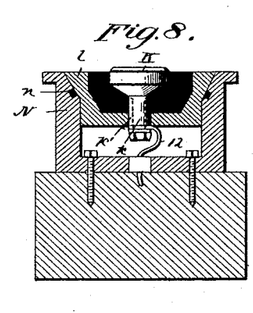
Figs. 8 and 9 are enlarged sectional views of track-contacts.

The contacts K are of metal and may be substantially of the form shown, having a shank or stem with an enlarged head. The stems $k$ are enveloped by a sleeve of insulating material $k'$. (See Fig. 8.) They are then secured in strong, preferably cast-iron, boxes $l$, which are adapted to fit into casings N, which are permanently secured in the roadbed, and a water-tight joint is secured by the interposition of a rubber gasket $n$. With this construction I am enabled at any time to remove the contacts K and the part to which they are directly secured, namely, the box $l$, for inspection or repair. The contacts are connected by wires 12 with the conductors 9 and 11. As described, the working conductors comprise one side of the circuit, the return being through a conductor 3, which is suitably connected back to the source of current.

Figure 9:
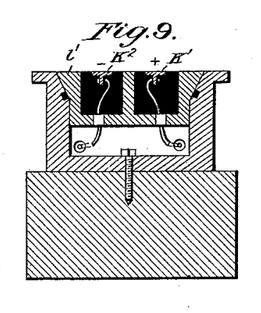

The contacts K may be elongated, as indicated at K' K$^2$, Fig. 9, where they are shown in the form of T-rails embedded in insulating material and also contained in box $l'$, which with this construction will be of elongated rectangular form.

Instead of operating the switch-actuating mechanism by mechanical means I may, as indicated in Fig. 7, use a magnet O, carried by the car, which magnet will operate in passing to raise a magnetic armature P, contained in a suitable water-tight casing N', located at any convenient point between or adjacent to the track and covered by a water-tight cap $l^2$ of non-magnetic material. The armature P is connected to a lever $p$, which may be provided with a suitable counterweight $p'$ and which carries an extension Q, which is preferably of conducting material and which fits between the jaws of a circuit-breaker R, said jaws being insulated from each other and connected in the conductor 7 of the box E, so that when the armature P is drawn upward by the magnet O the part Q will be withdrawn from between the jaws of the circuit-breaker, thereby opening the conductor 7 and disturbing the balance previously existing in the switch-box and throwing it into operation, as described.

Figure 10:
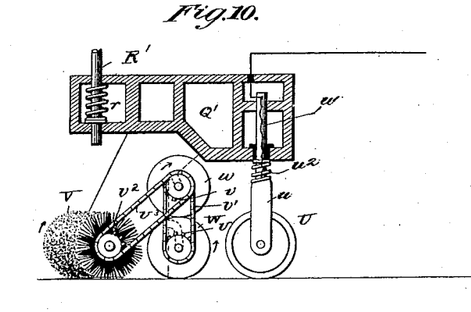

With the arrangement shown in Figs. 2 and 3 I use the current-collecting device seen in Fig. 10, in which Q' is a frame pivotally attached to the car by the spindle R', which is provided with a spring $r$, which will permit of the frame having a limited vertical movement. The contact device is shown as a wheel U, of any desired conducting material, which is pivotally mounted in a fork $u$, which fork is provided with a stem $u'$, which is pivoted in the rear end of the frame Q' and provided with a spring $u^2$. The stem $u'$ is suitably insulated from the frame Q' and is connected with the main conductor leading to the motor-circuit. The contact device being pivoted considerably in rear of the support of the frame Q' will trail automatically in the path of the contacts even in passing around curves. I also provide the contact device with a cleaning attachment preceding it.

V is a rotating broom which rests upon the portion of the track occupied by the contact blocks or strips.

W is a roller between the brush and the contact-wheel, and it is provided with a facing of rubber or other soft material resting upon the surface and which will squeeze the moisture and dirt from off the contact blocks or strips, leaving them comparatively clean for contact with the roller U. A second wheel $w$ is pivotally mounted above the wheel W and in frictional contact therewith. Being rotated by its frictional contact with the said wheel W, the wheel $w$ acts as a frictional driver for the broom through suitable mechanical connections, as will appear. The axes of the wheels W and $w$ are provided with sprocket-teeth $v$ $v$, mechanically connected by a sprocket-chain $v'$. A second sprocket-wheel (not shown) is provided on the axis of the roller W, and a corresponding sprocket $v^2$ is provided upon the axis of the broom 5. These sprockets are also connected by a chain $v^3$, so that the direction of the rotation of the broom will be opposite to that of the roller W and such as to throw the dirt diagonally forward and away from the contact-blocks as it passes over them.

Figure 4:
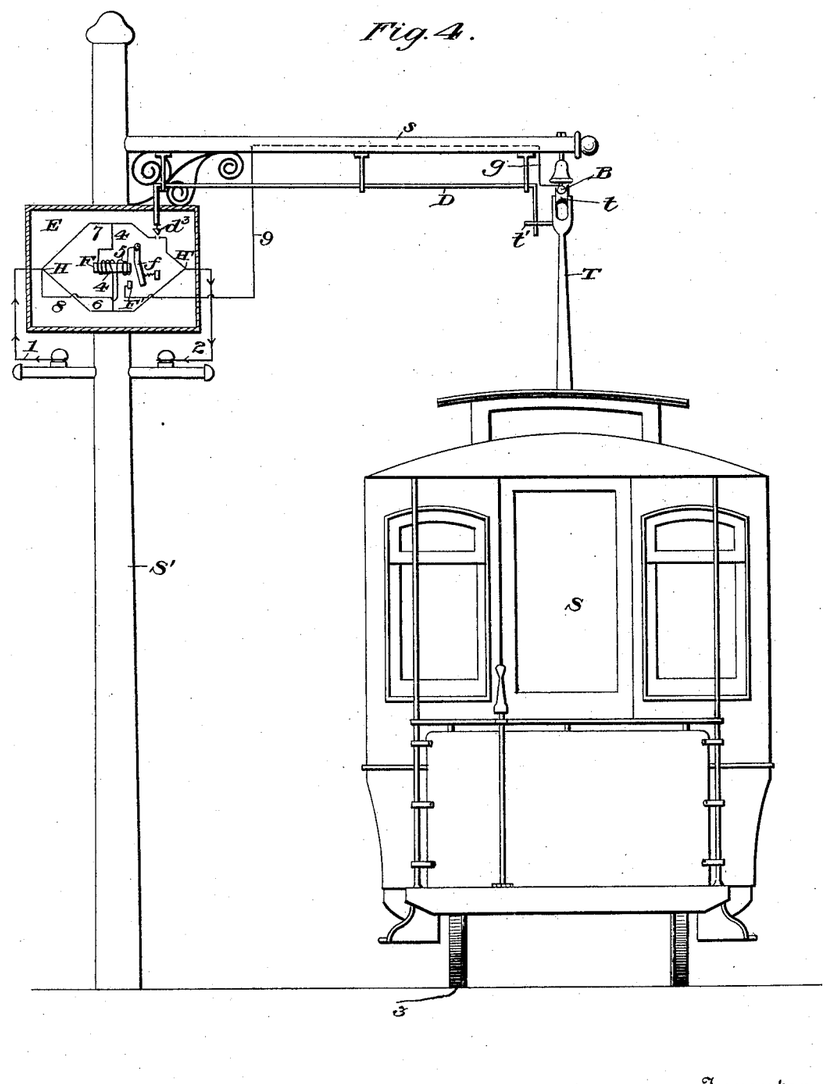
Fig. 4 is a view in elevation illustrating my invention as applied to the overhead system, with a portion of the switch-box and conductors in diagram.

While I have thus far described my system as applied to underground and surface-contact electric railways, it is equally applicable to the overhead or trolley system, as indicated in Fig. 4, in which S is the car. S' is a pole provided with bracket $s$, which carries the trolley-wire B, suspended from a suitable insulator. T is the trolley-pole. $t$ is the trolley-wheel, engaging the conductor B, and $t'$ is a tappet or lug extending from the upper end of the trolley-pole. D is a rock-shaft, which is connected at its inner extremity with the circuit-breaking device $d^3$ and at its outer end is turned down into the path of the tappet $t'$. 1 is the main supply-conductor, carried upon a suitable insulator attached to the pole and entering the box E, as previously described, where it divides into the two equal branches 6 and 7, reuniting at the point H' and passing by conductor 2 to the next box. In this box the magnet F alone is shown, and this is provided with the duplex winding 4 5, the winding 4 constituting the bridge between the conductors 6 and 7, through which current will be diverted to draw the armature $f$ and thereby complete the conductor-feeding circuit when the balance between the conductors 6 and 7 is disturbed by the momentary opening of the circuit 7 by the rocking of the shaft D. The armature $f$ having been attracted momentarily, the feeding connections 8 9 are established through the conductor 8, secondary coil 5, armature $f$, contact F', and conductor 9, which is connected with the section of the main working conductor or trolley-wire B, onto which the trolley-wheel is passing, and thereby of course cutting out the box-supplying section which is left by depriving the automatic circuit-making devices of the current necessary to sustain them in operative position.

The construction and arrangement hereinbefore described may be modified by persons skilled in the art in many ways without the exercise of invention in view of the foregoing.

Having described my invention, what I claim is—

1. A switch for electric circuits comprising a divided and balanced circuit, switching devices connected in a bridge across said balanced circuit, mechanical means for disturbing the balance of the balanced circuit, and connections controlled by the switching devices for closing a supply-circuit whenever the balance of the balanced circuit is disturbed.

2. A switch for electric-railway systems comprising a divided and balanced circuit, switching devices connected in a bridge across said balanced circuit, mechanical means connected with the vehicle traveling along the railway for actuating and disturbing the balanced circuit and energizing the switches in a bridge between them, and connections between a supply-conductor and working conductor of the railway, said connections including the switches and adapted to be opened or closed thereby.

3. In an electric-railway system, the combination with a sectional working conductor, of feeding connections therefor, a main supply-conductor having a divided and balanced portion, automatic switching devices bridging the divided circuit for connecting the main supply and feeder connections, and means for disturbing the balance of the divided circuit and thereby energizing the automatic switches.

4. A switch for an electric-railway system comprising a divided and balanced main supply-circuit, automatic switching devices connected in a bridge across said balanced circuit, and mechanical means for closing the supply-circuit of the conductor through said box by disturbing the balance of the supply-circuit passing therethrough.

5. In an electric-railway system having a sectional or disconnected working conductor, a main supply-circuit, feeder connections for the sectional or disconnected working conductor and automatic switching devices between the main supply and feeder connections, and means carried by the car for momentarily disturbing the electrical conditions of the automatic switching devices and closing the circuit between the main supply and feeder connections.

6. In an electric railway having a sectional or disconnected main conductor, an automatic switching device for supplying one or more of said sections or disconnected conductors, and comprising a divided and balanced circuit passing through said box, automatic switching devices adapted to connect the main supply-circuit with the conductor to be supplied, and automatic means for energizing the switching devices by disturbing the balance of the divided switch-actuating conductor.

7. The combination in an electric railway having a sectional or divided conductor, of a main supply-circuit, automatic switching devices, feeder connections to the conductor to be supplied, a divided and balanced circuit passing through two or more of the switch-boxes of the railway, automatic means operated by the passage of a car to disturb the balance of the divided switch-box circuit, whereby a portion of the current traversing the same is shunted through the switching devices, and the same become energized to close the supply-circuit upon the feeder connections, a resistance in the car-circuit and a switch arranged to connect either the motor or the switch with the working circuit.

8. The combination in an electric-railway system of an automatic switching device, feeder connections to the conductor to be supplied, a divided and balanced circuit between the sides by which the automatic switching devices are connected, mechanical means carried by the car for disturbing the balance and energizing the switches, a resistance upon the car and switch in the working circuit on the car adapted to connect with either the motor or the resistance, whereby a constant flow of current is maintained upon the active working conductor until the car passes to another section.

9. A sectional track-contact comprising a succession of succeeding rails separated at their ends by insulating material, a metallic box into which each of the succeeding rails is secured by solid insulating material surrounding said rails, but leaving their upper sides exposed, and a stationary support for said containing-boxes from which support the said boxes are movable.

10. The combination with an electric-railway car, of a rotatably-mounted trailing frame, a contact device hinged and pivoted at the rear part of said frame, so that it will trail behind the pivotal connection, a contact-cleaning device in advance of said contact, a rotatably-mounted broom in advance of said contact-cleaning device, a frictional driving apparatus engaging the contact-cleaning device, and mechanical connections between the contact-cleaning device, said friction-driver, and the axis of the broom.

11. The combination with a car, of a suitable support pivotally connected therewith at its front end, a contact device pivotally attached to the rear end thereof, a contact-cleaning roller, of the contact-cleaning roller a revolving broom in advance thereof, and mechanical connections between the roller and the broom for rotating the same.

12. An automatic switch-box comprising a circuit passing therethrough and divided into equal balanced sides, a circuit-breaker included in one side of said circuit and comprising a pair of oppositely-acting spring-arms provided with contacts of similar material, a stationary block of contacting material against which said contacts normally rest to complete the circuit, and a mechanically-actuated arm extending between said contacts and adapted when the same is moved to push one or the other of the contacts away from the stationary block and thereby open the circuit.

In testimony whereof I hereto affix my signature in presence of two witnesses.

JOHN P. ALEXANDER.

Witnesses:
  STEPHEN JANUS,
  HARRY Y. DAVIS.